(12) United States Patent
Cheng et al.

(10) Patent No.: US 10,775,921 B2
(45) Date of Patent: Sep. 15, 2020

(54) METHOD OF CONTROLLING TIMING FOR TOUCH AND DISPLAY DRIVER SYSTEM AND TOUCH AND DISPLAY DRIVER SYSTEM USING THE SAME

(71) Applicant: NOVATEK Microelectronics Corp., Hsin-Chu (TW)

(72) Inventors: Huan-Teng Cheng, Hsinchu (TW); Huang-Chin Tang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 21 days.

(21) Appl. No.: 16/237,754

(22) Filed: Jan. 2, 2019

(65) Prior Publication Data

US 2020/0210015 A1     Jul. 2, 2020

(51) Int. Cl.
  *G06F 3/041*    (2006.01)
  *G09G 5/12*    (2006.01)

(52) U.S. Cl.
  CPC ............. *G06F 3/0416* (2013.01); *G09G 5/12* (2013.01); *G09G 2310/08* (2013.01)

(58) Field of Classification Search
  CPC ..... G06F 3/0416; G09G 5/12; G09G 2310/08
  See application file for complete search history.

(56) References Cited

U.S. PATENT DOCUMENTS

| 4,523,228 | A | * | 6/1985 | Banker | ................ | H04N 7/1713 |
| | | | | | | 348/E7.067 |
| 8,872,783 | B2 | | 10/2014 | Saitoh | | |
| 2004/0150605 | A1 | * | 8/2004 | Arimoto | ............. | G09G 3/3648 |
| | | | | | | 345/100 |
| 2013/0069894 | A1 | * | 3/2013 | Chen | ..................... | G06F 3/0412 |
| | | | | | | 345/173 |
| 2015/0277657 | A1 | * | 10/2015 | Azumi | ................... | G06F 3/0416 |
| | | | | | | 345/174 |
| 2017/0060337 | A1 | | 3/2017 | Kim | | |
| 2017/0123582 | A1 | | 5/2017 | Kim | | |
| 2018/0329570 | A1 | * | 11/2018 | Chan | ..................... | G06F 3/0418 |
| 2018/0349667 | A1 | * | 12/2018 | Kim | ....................... | G06F 1/1684 |
| 2019/0279600 | A1 | * | 9/2019 | Chan | ..................... | G06F 3/0412 |

FOREIGN PATENT DOCUMENTS

| CN | 104699369 A | 6/2015 |
| TW | 200813960 | 3/2008 |
| TW | 201901386 A | 1/2019 |

\* cited by examiner

*Primary Examiner* — Amare Mengistu
*Assistant Examiner* — Crystal Mathews
(74) *Attorney, Agent, or Firm* — Winston Hsu

(57) ABSTRACT

A method of controlling timing for a touch and display driver system includes the steps of: receiving an external signal; generating a plurality of time units each having a display period and a touch period; generating an internal signal for controlling a display operation in the display period; and synchronizing the internal signal with the external signal for a time unit among the plurality of time units at a time point different from at least one of the start of the time unit and the end of the time unit.

8 Claims, 6 Drawing Sheets

METHOD OF CONTROLLING TIMING FOR TOUCH AND DISPLAY DRIVER SYSTEM AND TOUCH AND DISPLAY DRIVER SYSTEM USING THE SAME

BACKGROUND OF THE INVENTION

1. Field of the Invention

The present invention relates to a method for a touch and display driver system, and more specifically, to a method of controlling timing for a touch and display driver system.

2. Description of the Prior Art

In recent years, touch sensing technology advances rapidly, and many consumer electronic products such as mobile phones, GPS navigator systems, tablets, personal digital assistants (PDA) and laptops are equipped with touch sensing functions. In various electronic products, touch sensing functions are included in a display area which originally had only display functions. In other words, an original display panel is replaced by a touch panel having both display and touch sensing functions. The touch panel can generally be divided into out-cell, in-cell and on-cell touch panel according to the difference in structure of the touch panel. The out-cell touch panel is composed of an independent touch panel and a general display panel. In the in-cell and on-cell touch panel, a touch sensing device is directly disposed on inside and outside of a substrate in the display panel, respectively.

For a general in-cell touch panel, in order to achieve a touch report rate different from the display refresh rate, a long horizontal blank (H-blank) scheme may be applied. In the related touch and display driver integrated circuit (TDDI), the display and touch sensing operations should be performed with time division, to prevent noise interference on the touch sensing operation and/or wrong display result; hence, the touch sensing may be performed at an H-blank period after several lines of display data is outputted. The specific H-blank period is extended so as to implement the touch sensing operation. This is the so-called long H-blank scheme, where touch sensing is performed after several line data is read out from a line memory of the TDDI. In a RAMless TDDI, the line memory is not enough to store an entire frame of image data; hence, the display time for a frame should be separated into several time units, and touch sensing is performed in the long H-blank period after each display time unit.

However, in a TDDI using a general long H-blank scheme, the long H-blank period usually appears in the same gate lines, such that the turned-on time of these gate lines are significantly longer than the turned-on time of other gate lines. Therefore, the circuit elements such as the thin-film transistors (TFTs) in these gate lines deteriorate more rapidly than those in other gate lines, resulting in different display performance on these gate lines. For example, there may be unrecoverable horizontal lines appearing on the panel due to long-term stress on the TFTs in these gate lines.

Thus, there is a need to provide a novel long H-blank scheme to achieve a better visual performance of the touch panel while solving the problem of imbalanced stress in the gate lines.

SUMMARY OF THE INVENTION

It is therefore an objective of the present invention to provide a method of controlling timing for a touch and display driver system, in order to realize the long horizontal blank (H-blank) scheme.

An embodiment of the present invention discloses a method of controlling timing for a touch and display driver system. The method comprises the steps of: receiving an external signal; generating a plurality of time units each having a display period and a touch period; generating an internal signal for controlling a display operation in the display period; and synchronizing the internal signal with the external signal for a time unit among the plurality of time units at a time point different from at least one of the start of the time unit and the end of the time unit.

Another embodiment of the present invention discloses a touch and display driver system, which comprises a receiver and a timing generator. The receiver is configured to receive an external signal. The timing generator, coupled to the receiver, is configured to perform the following steps: generating a plurality of time units each having a display period and a touch period; generating an internal signal for controlling a display operation in the display period; and synchronizing the internal signal with the external signal for a time unit among the plurality of time units at a time point different from at least one of the start of the time unit and the end of the time unit.

These and other objectives of the present invention will no doubt become obvious to those of ordinary skill in the art after reading the following detailed description of the preferred embodiment that is illustrated in the various figures and drawings.

DETAILED DESCRIPTION

A general touch and display driver integrated circuit (TDDI) for controlling a panel to display may receive Mobile Industry Processor Interface (MIPI) video data from a video source and correspondingly output display data to the panel. A MIPI synchronization signal may be received or generated from the received data, and the TDDI may deliver the display data based on the MIPI synchronization signal as a horizontal synchronization (H-sync) signal. However, if the touch sensing functionality is incorporated, the display time is compressed to extract time periods for the touch sensing operations. In such a situation, the TDDI is required to generate an internal synchronization signal having a higher frequency than the MIPI synchronization signal, to control the operations of delivering display data. In an embodiment, the internal synchronization signal may also be an H-sync signal synchronizing the transmission time of each line data.

Figure 1:
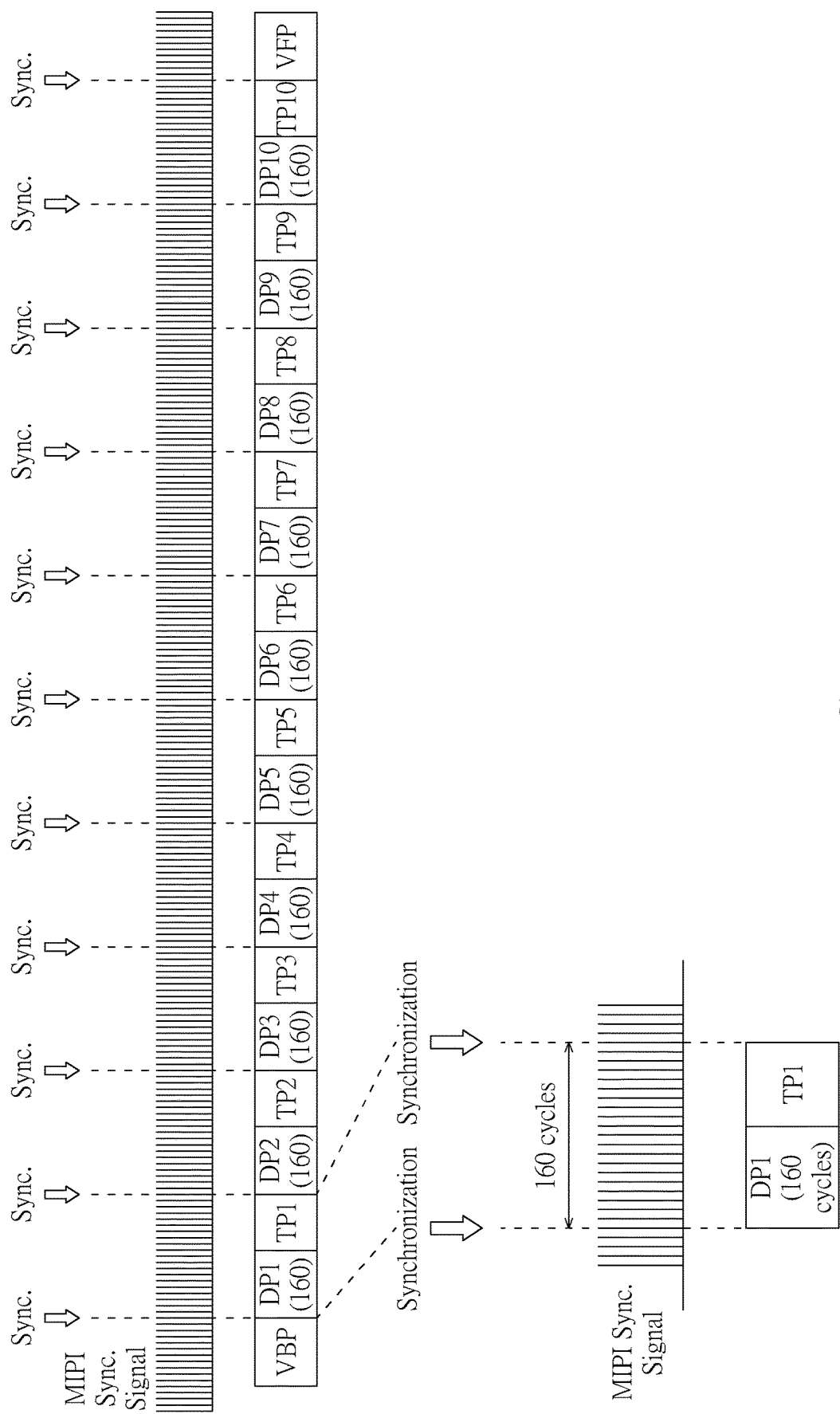
FIG. 1 is a schematic diagram of the display time of a frame of image data separated into multiple time units with touch sensing operations using the long H-blank scheme.

Please refer to FIG. 1, which is a schematic diagram of the display time of a frame of image data separated into multiple time units with touch sensing operations using the long horizontal blank (H-blank) scheme. With insufficient line memory in the TDDI, especially the RAMless TDDI, separation of time units for processing a frame of image data is necessary. As shown in FIG. 1, the frame of image data starts after a vertical back porch (VBP) and ends as being followed by a vertical front porch (VFP). The display time of an image frame is separated into 10 time units, each having a display period (DP1-DP10) and a touch period (TP1-TP10). For example, the first time unit is composed of the display period DP1 and the touch period TP1, the second time unit is composed of the display period DP2 and the touch period TP2, and so on. The display periods DP1-DP10 are the time periods configured to output display data to a panel, and the touch periods TP1-TP10 are the time periods configured to output touch driving signals to the panel and responsively receive the touch sensing signals. The display data is received based on the MIPI synchronization signal and outputted based on an internal synchronization signal having a higher frequency. For example, 160 lines of display data are received in each time unit; and with the internal synchronization signal, 160 lines of display data are outputted to the panel in each display period DP1-DP10 with a faster data rate. That is, the line count received in a time unit is the same as the line count outputted in the display period of a time unit. In this example, the MIPI synchronization signal and the internal synchronization signal are synchronized at the start of each time unit. In other words, the synchronization is performed every 160 MIPI synchronization signals, and a touch period is stopped and a follow-up display period starts when the $161^{st}$ MIPI H-sync signal is received. Note that the time units have equal lengths, and the display periods DP1-DP10 in every period are configured to output the same number of line data corresponding to the same number of gate lines (e.g., 160 lines); hence, the lengths of the touch periods TP1-TP10 are also equal.

Note that the synchronization at the start of each time unit is necessary due to the limited line memory. As mentioned above, the data rate of reading out display data from the line memory based on the internal synchronization signal is faster than the data rate of receiving display data and writing display data into the line memory based on the external synchronization signal. In a time unit, the system may enter the touch period after a specific number of line data are outputted, e.g., 160 lines, while new display data are still written into the line memory. Without timely synchronization to enter the next display period, the continuously written display data may be out of the capacity of the line memory, resulting in a tearing effect in the output image. Therefore, at a synchronization time point, the next time unit starts and a display period starts to read out display data from the line memory, allowing the number of line data written into the line memory to be the same as the number of line data read out from the line memory in each time unit. This achieves the read/write balance in the line memory so as to prevent the tearing effect. More separated time units for an image frame allow the usage of a smaller line memory.

Therefore, the touch sensing operation may be performed in the long H-blank period after 160 line data are outputted in each time unit, i.e., the long H-blank periods of the $160^{th}$ gate line, the $320^{th}$ gate line, the $480^{th}$ gate line, and so on. After a long-term operation with the abovementioned long H-blank scheme, the circuit elements in these gate lines may undergo more stress than those in other gate lines; hence, the display performance on these gate lines may degrade more rapidly, resulting in unrecoverable horizontal lines on the panel.

In order to solve the problem of stressed gate lines, a dynamic long H-blank scheme is applied, where the long H-blank period is allocated to different gate lines in different image frames. Please refer to FIG. 2, which is a schematic diagram of the display time of a frame of image data separated into multiple time units with touch sensing operations using the dynamic long H-blank scheme. In this example, the display time of an image frame is separated into 12 time units (TU1-TU12), each having a display period (DP1-DP12) and a touch period (TP1-TP12).

TABLE 1

| | For TP sensing = 10 time units | | | | | | | |
|---|---|---|---|---|---|---|---|---|
| | TU1 | | TU2 | | TU11 | | TU12 | |
| | DP1 line count | TP1 | DP2 line count | TP2 | ... DP11 line count | TP11 | DP12 line count | TP12 |
| Frame1 | 48 | (dummy) | 112 | TP2 | ... 112 | TP11 | 112 | (dummy) |
| Frame2 | 52 | (dummy) | 112 | TP2 | ... 112 | TP11 | 108 | (dummy) |
| Frame3 | 56 | (dummy) | 112 | TP2 | ... 112 | TP11 | 104 | (dummy) |
| Frame4 | 60 | (dummy) | 112 | TP2 | ... 112 | TP11 | 100 | (dummy) |
| Frame5 | 64 | (dummy) | 112 | TP2 | ... 112 | TP11 | 96 | (dummy) |
| Frame6 | 68 | (dummy) | 112 | TP2 | ... 112 | TP11 | 92 | (dummy) |
| Frame7 | 72 | (dummy) | 112 | TP2 | ... 112 | TP11 | 88 | (dummy) |
| Frame8 | 76 | (dummy) | 112 | TP2 | ... 112 | TP11 | 84 | (dummy) |
| Frame9 | 80 | (dummy) | 112 | TP2 | ... 112 | TP11 | 80 | (dummy) |
| Frame10 | 84 | (dummy) | 112 | TP2 | ... 112 | TP11 | 76 | (dummy) |
| Frame11 | 88 | (dummy) | 112 | TP2 | ... 112 | TP11 | 72 | (dummy) |
| Frame12 | 92 | (dummy) | 112 | TP2 | ... 112 | TP11 | 68 | (dummy) |
| Frame13 | 96 | (dummy) | 112 | TP2 | ... 112 | TP11 | 64 | (dummy) |
| Frame14 | 100 | (dummy) | 112 | TP2 | ... 112 | TP11 | 60 | (dummy) |
| Frame15 | 104 | (dummy) | 112 | TP2 | ... 112 | TP11 | 56 | (dummy) |
| Frame16 | 108 | (dummy) | 112 | TP2 | ... 112 | TP11 | 52 | (dummy) |
| Frame17 | 112 | (dummy) | 112 | TP2 | ... 112 | TP11 | 48 | (dummy) |

In detail, in the time unit TU1, the received number of line data (line count) is different in each image frame. In such a situation, the long H-blank period may be shifted to different gate lines in different image frames. For example, the long H-blank period is allocated to the 48$^{th}$ gate line in Frame 1, the 52$^{nd}$ gate line in Frame 2, the 56$^{th}$ gate line in Frame 3, and so on. Therefore, the dynamic long H-blank scheme allows the long H-blank period to appear in different gate lines in different image frames, so as to reduce the imbalanced stress problem and prevent the undesired horizontal lines on the panel.

Subsequently, in the time units TU2-TU11, the received and outputted data are fixed to 112 lines. In the last time unit TU12, the numbers of line data are also different in different image frames, to complement the total line count of the entire frame. With the synchronization scheme mentioned above, the number of line data written into the line memory is the same as the number of line data read out from the line memory in each time unit; hence, the length of the touch period TP1, which is equal to the length of the time unit TU1 minus the length of the display period DP1, may be different in different image frames. In addition, the length of the touch period TP12, which is equal to the length of the time unit TU12 minus the length of the display period DP12, may be different in different image frames. For example, with a decreased (or increased) number of outputted line data in the display period, the line data received by the TDDI are also decreased (or increased) to the same level; hence, the length of the touch period is decreased (or increased) proportionally.

Figure 2:
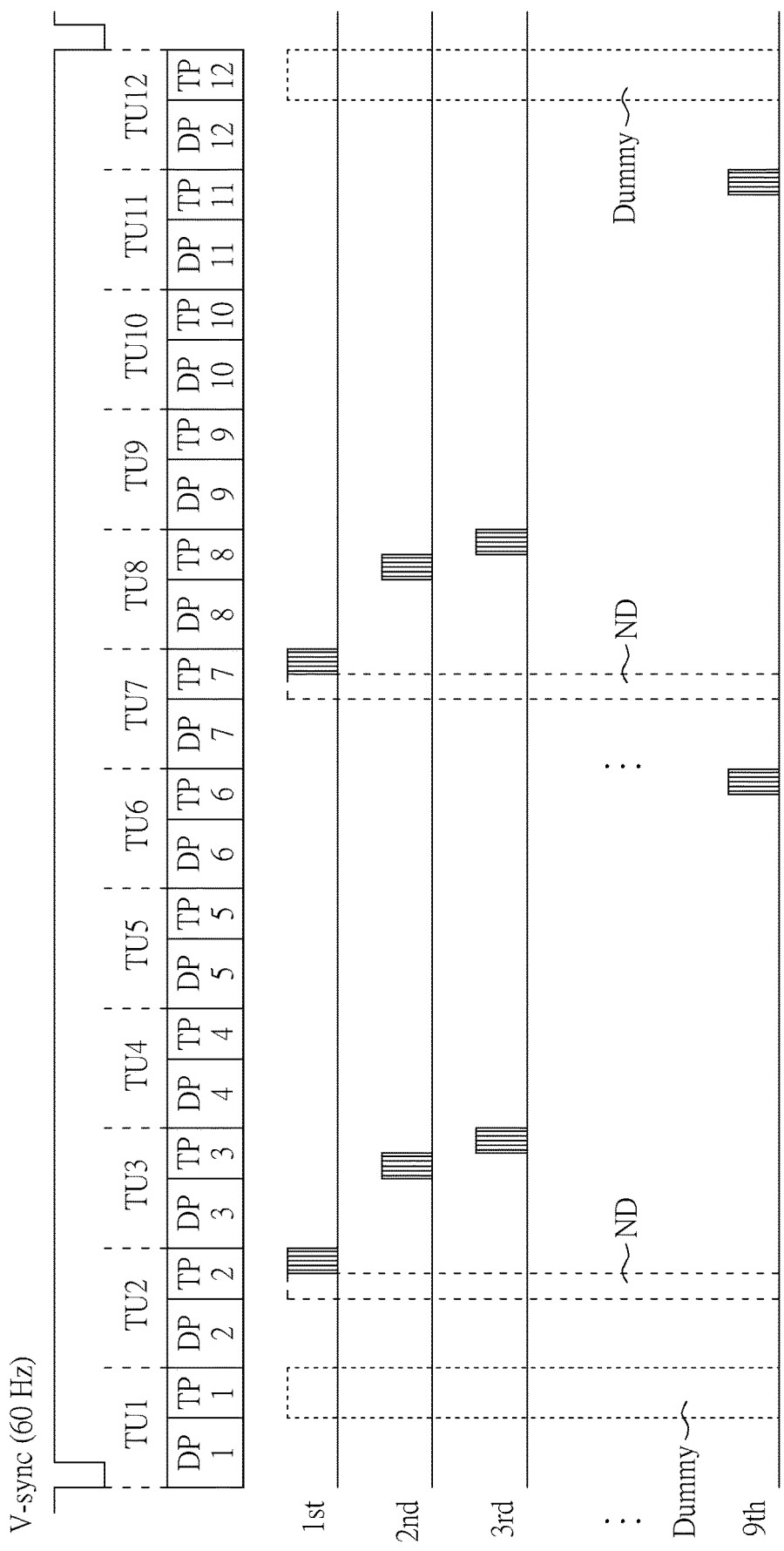
FIG. 2 is a schematic diagram of the display time of a frame of image data separated into multiple time units with touch sensing operations using the dynamic long H-blank scheme.

As shown in FIG. 2, the decreased or increased touch periods TU1 and TU12 cannot be applied to perform touch sensing operations, and only the touch periods TU2-TU11 having the same length may be feasible. In this example, the refresh rate of the image is 60 Hz, as controlled by the vertical synchronization (V-sync) signal, while the touch report rate is doubled, i.e., 120 Hz; hence, the touch sensing operation may scan through the entire panel twice while a frame of image data is displayed. In detail, the touch panel may include 9 columns of touch sensing electrodes. The touch periods TP2-TP6 are configured to perform the first scan from the 1$^{st}$ column to the 9$^{th}$ column of touch sensing electrodes, where the first half of the touch period TP2 is allocated to perform noise detection (ND), which is necessary in the touch sensing operations for obtaining a basis of the sensing values. Similarly, the touch periods TP7-TP11 are configured to perform the second scan from the 1$^{st}$ column to the 9$^{th}$ column of touch sensing electrodes, where the first half of the touch period TP7 is allocated to perform noise detection. The touch periods TP1 and TP12 of the first time unit TU1 and the last time unit TU12 are dummy periods, which cannot be allocated to the touch sensing operation or display operation and are therefore wasted.

Therefore, the present invention provides another dynamic long H-blank scheme, in order to efficiently utilize all time periods for the touch sensing operation and the display operation, while the problem of imbalanced stress in the gate lines is still prevented.

Figure 3:
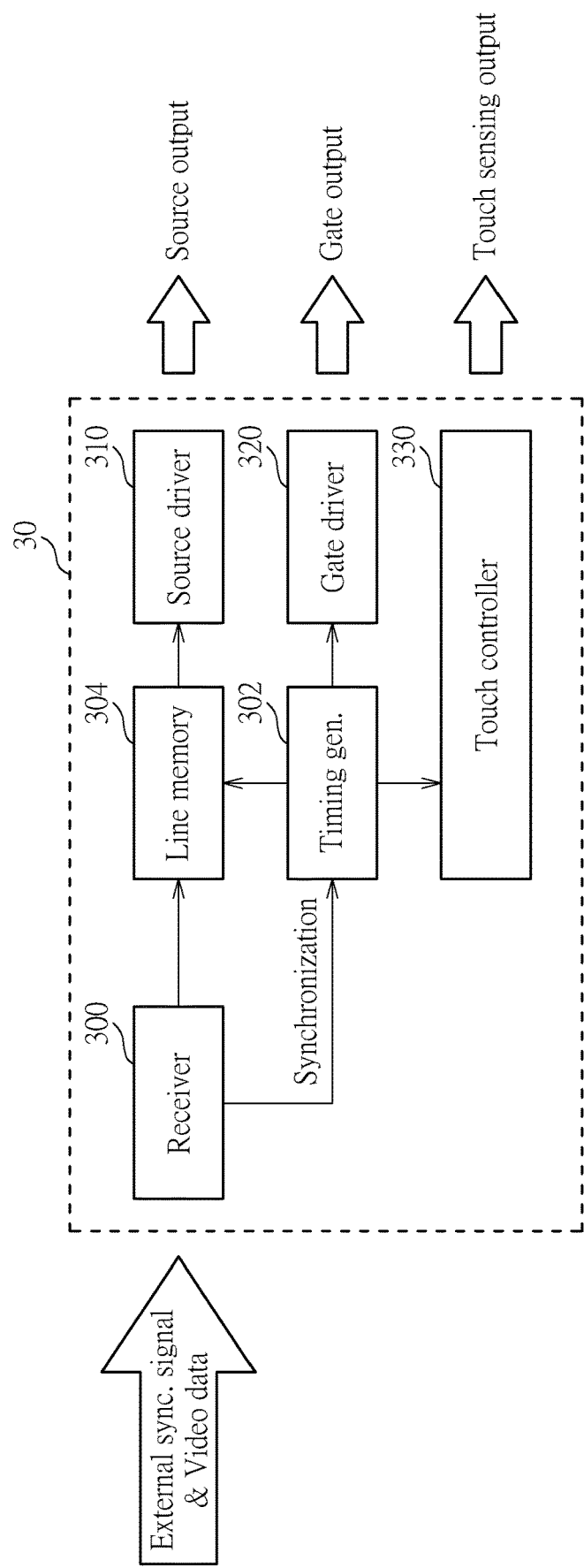
FIG. 3 is a schematic diagram of a touch and display driver system according to an embodiment of the present invention.

Please refer to FIG. 3, which is a schematic diagram of a touch and display driver system 30 according to an embodiment of the present invention. The touch and display driver system 30 may be implemented as a TDDI. As shown in FIG. 3, the touch and display driver system 30 includes a receiver 300, a timing generator 302, a line memory 304, a source driver 310, a gate driver 320 and a touch controller 330. The receiver 300 is configured to receive an external synchronization signal such as the MIPI H-sync signal. The external synchronization signal together with video data may continuously be transmitted to the touch and display driver system 30 during the display procedure. In an embodiment, the receiver 300 may include a physical layer circuit and a display serial interface (DSI) circuit. After being decoded by the receiver 300, the video data are transmitted to the line memory 304 to be stored, and the external synchronization signal is transmitted to the timing generator 302. The timing generator 302, coupled to the receiver 300, is configured to generate an internal synchronization signal based on the received external synchronization signal, wherein the frequency of the internal synchronization signal is higher than the frequency of the external synchronization signal. The external synchronization signal controls each line data received by the receiver 300 to be written into the line memory 304; specifically, a cycle time of the external synchronization signal may be configured to write a line of display data. The internal synchronization signal controls each line data to be read out from the line memory 304 and forwarded to the panel to be displayed during the display period; specifically, a cycle time of the internal synchronization signal may be configured to read out a line of display data. In an embodiment, the timing generator 302 may include an oscillator for generating the internal synchronization signal, which may be considered as a clock signal. Further, the timing generator 302 is responsible for controlling the synchronization relations between the external synchronization signal and the internal synchronization signal, so as to control the output operations of the source driver 310, the gate driver 320 and the touch controller 330.

In addition, the source driver 310 is configured to output display data, and the gate driver 320 correspondingly outputs gate control signals for controlling the target pixels to receive the display data. The touch controller 330 is configured to output touch driving signals and correspondingly receive touch sensing signals during the touch period. In another embodiment, the touch controller 330 may be integrated with the source driver 310, and/or all of the source driver 310, the gate driver 320 and the touch controller 330 may be integrated in a single module. The detailed implementations and operations of the source driver 310, the gate driver 320 and the touch controller 330 are well known by those skilled in the art, and will not be narrated herein.

Figure 4:
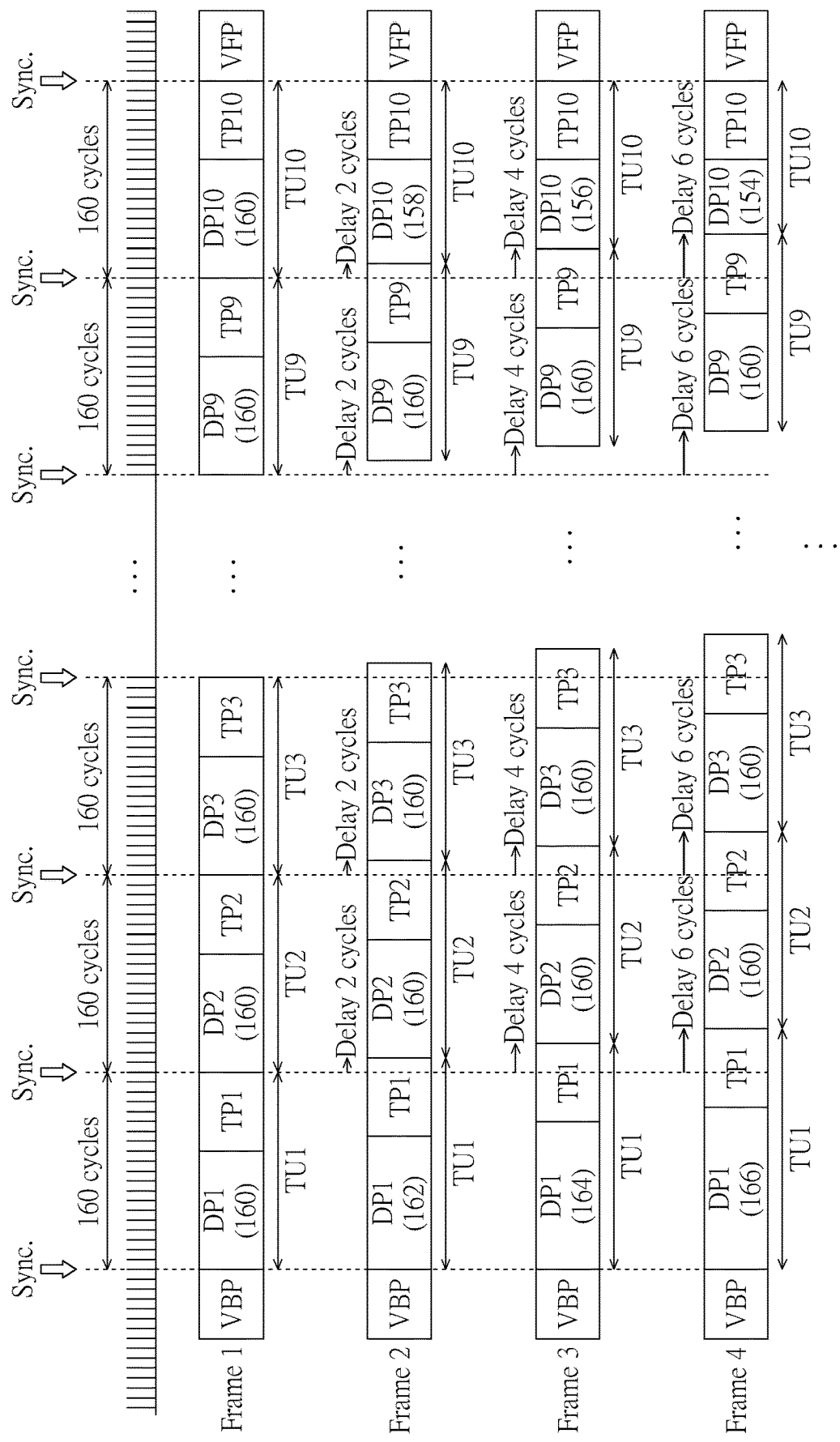
FIG. 4 is a schematic diagram of the display time of a frame data with a dynamic long H-blank scheme according to an embodiment of the present invention.

FIG. 4 shows the display time of a frame data with a dynamic long H-blank scheme according to an embodiment of the present invention. In this long H-blank scheme, a frame of display data is also separated into a plurality of time units TU1-TU10 and each time unit has a display period (DP1-DP10) and a touch period (TP1-TP10), but the synchronization method is different from the cases shown in FIG. 1 and FIG. 2. In detail, for each time unit, the internal synchronization signal may be synchronized with the external synchronization signal at a time point different from at least one of the start of the time unit and the end of the time unit. As for Frame 1, the internal synchronization signal and the external synchronization signal are synchronized at the start of each time period (and may be considered as being synchronized at the end of each time period). Each time unit is divided into a display period and a touch period, and each display period is allocated to output 160 lines of display data. Thus, in each time unit, the external synchronization signal includes 160 cycles for writing 160 lines of display data into the line memory 304, and 160 cycles of the internal synchronization signal are configured for reading 160 lines of display data from the line memory 304 in the display period, and the remaining time period is configured as the touch period.

As for Frame 2, the internal synchronization signal and the external synchronization signal are synchronized at the start of the time unit TU1, i.e., the start of the Frame 2. In order to solve the imbalanced stress problem, the time unit TU1 is configured to output 162 lines of display data in the display period DP1 (with 162 cycles of the internal synchronization signal), and the remaining time period is the touch period TP1. Subsequently, after 160 cycles of the external synchronization time signal, the internal synchronization signal and the external synchronization signal are synchronized at the next synchronization time point, which is different from the end of the time unit TU1 and the start of the time unit TU2. The end of the time unit TU1 falls behind this synchronization time point by 2 cycles of the internal synchronization signal. In such a situation, the end of the touch period TP1 is delayed from the synchronization time point by 2 cycles of the internal synchronization signal, while the touch period TP1 starts after 162 cycles of the internal synchronization signal. Therefore, the length of the touch period TP1 in Frame 2 is equal to the length of the touch period TP1 in Frame 1 since both the start and end of the touch period TP1 are delayed by 2 cycles of the internal synchronization signal in Frame 2.

Similarly, after another 160 cycles of the external synchronization time signal, the internal synchronization signal and the external synchronization signal are synchronized at the next synchronization time point. The time unit TU2 ends and the time unit TU3 starts at a time point behind this synchronization time point by 2 cycles of the internal synchronization signal. Subsequently, the time unit TU3 ends and the time unit TU4 starts at a time point behind the corresponding synchronization time point by 2 cycles of the internal synchronization signal, and so on. Therefore, as for Frame 2, the touch periods TP2-TP9 have the same length as the touch period TP1. The length of the touch period TP10 is also equal because the display period DP10 includes 2 less cycles of the internal synchronization signal than others, i.e., 158 cycles. Therefore, with equal length, all touch periods are applicable to the touch sensing operations, and thus no dummy period is wasted. In addition, there are 162 lines of display data outputted in the first display period DP1; hence, the long H-blank periods are shifted by 2 gate lines to the $162^{nd}$ gate line, the $322^{nd}$ gate line, the $482^{nd}$ gate line, and so on.

As for Frame 3, the end of each time unit TU1-TU9 falls behind the corresponding synchronization time point by 4 cycles of the internal synchronization signal; hence, the long H-blank periods are shifted by 4 gate lines, while the lengths of the touch periods TP1-TP10 in each of the time units TU1-TU10 are substantially equal, allowing every touch period to be applicable to the touch sensing operations.

In the same manner, each of the time units TU1-TU10 in each image frame may be allocated to have a display period for outputting a preconfigured number of line data and a touch period having an equal length. In the first display period DP1 in each image frame, the numbers of line data to be outputted are different, and thus the corresponding cycle counts of the internal synchronization signal are different. This shifts the long H-blank periods to different gate lines in different image frames. In addition, the ends of the time units are delayed by a corresponding cycle count from the synchronization time point, so as to allow all touch periods to have an equal length.

In this dynamic long H-blank scheme, the synchronization scheme defines a fixed number of cycles of the external synchronization signal between two consecutive synchronization time points, while the start and/or the end of each time unit may be shifted or delayed by a predetermined number of cycles of the internal synchronization signal (except the time units in Frame 1). The number of delayed cycles should be different in different image frames, to generate the long H-blank period in different gate lines and thereby achieve the balanced stress of the gate lines. In addition, since the number of cycles of the external synchronization signal between every two consecutive synchronization time points is identical (e.g., all equal to 160 cycles), the read/write operation of the image data may be well controlled with the synchronization scheme. This prevents the tearing effect resulted from imbalanced read/write speeds and also reduces the size of the line memory to a satisfactory level.

Furthermore, since all touch periods have an equal length and there is no dummy period, the touch sensing and/or display operations may be performed more efficiently. In other words, all periods may be allocated to the touch sensing operations or the display operations according to system requirements without any wastes. For example, as for a liquid crystal display (LCD), if the dummy period in FIG. 2 is allocated to the display operations, the image data will have more time to drive the liquid crystals to reach their target states, so as to improve the visual performance. With increasing resolution in the next generation of display devices, the increasing display periods may be more important. Alternatively or additionally, the dummy period in FIG. 2 may be allocated to the touch sensing operations, so as to improve the touch sensing performance by increasing the sensing time.

Please note that the present invention aims at providing a dynamic long H-blank scheme capable of solving the problem of imbalanced stress in the gate lines and also preventing the wasted time periods during the display and touch sensing operations. Those skilled in the art may make modifications and alternations accordingly. For example, in the above embodiment as shown in FIG. 4, the end of a touch period is delayed from the synchronization time point by 2 cycles of the internal synchronization signal in Frame 2, delayed by 4 cycles in Frame 3, delayed by 6 cycles in Frame 4, and so on. In another embodiment, the number of delayed cycles may be any other possible value. In addition, the timing allocation of each time unit should not be limited to the implementations mentioned above. For example, in the above embodiment, 160 lines of display data are grouped to be received in a time unit (except the first time unit and the last time unit of the image frame). In another embodiment, the data line number in each group may be other feasible value, and the cycles of the external and internal synchronization signals in each group may be adjusted accordingly. Alternatively or additionally, a time unit may start with a touch period followed by a display period.

Figure 5:
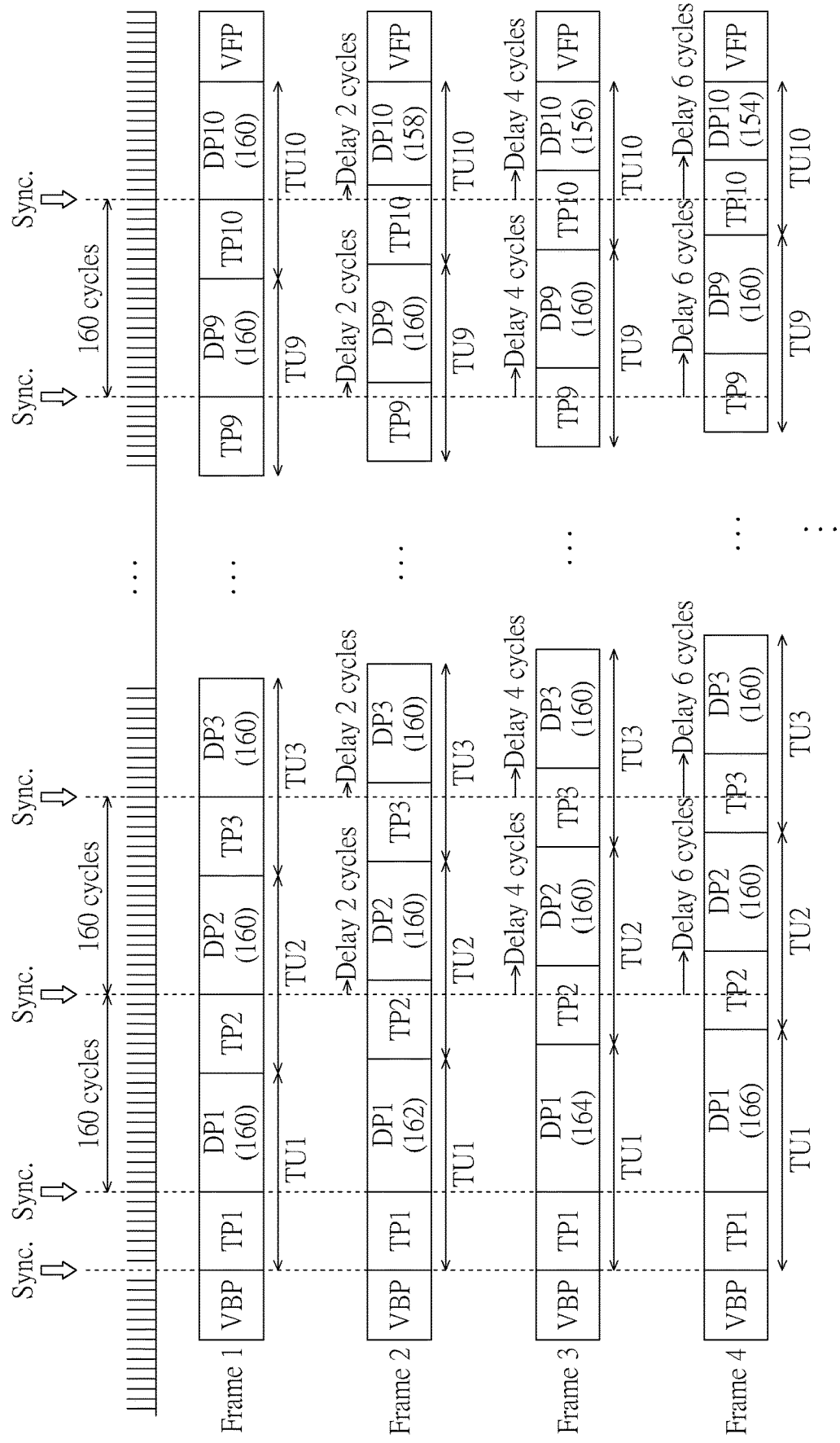
FIG. 5 is a schematic diagram of the display time of a frame data with another dynamic long H-blank scheme according to an embodiment of the present invention.

Please refer to FIG. 5, which is a schematic diagram of the display time of a frame data with another dynamic long H-blank scheme according to an embodiment of the present invention. This dynamic long H-blank scheme is similar to the dynamic long H-blank scheme as shown in FIG. 4. The only difference is that the time unit in the dynamic long H-blank scheme shown in FIG. 5 starts with a touch period followed by a display period.

As shown in FIG. 5, at the start of each image frame, synchronization of the external synchronization signal and the internal synchronization signal is performed. The next synchronization appears at the end of the first touch period TP1 and the start of the first display period DP1 in the first time unit TU1. As for Frame 1, the internal synchronization signal is synchronized with the external synchronization signal at the end of each touch period. As for other image frames, the end of each touch period (except the touch period TP1) and the start of each display period (except the display period DP1) are delayed and thus fall behind the corresponding synchronization time point by a predetermined number of cycles of the internal synchronization signal. With different numbers of line data outputted in the display period DP1 and different delayed cycles in different image frames, the long H-blank period may appear in different gate lines, which achieves the balanced stress of the gate lines without any wasted time periods.

Figure 6:
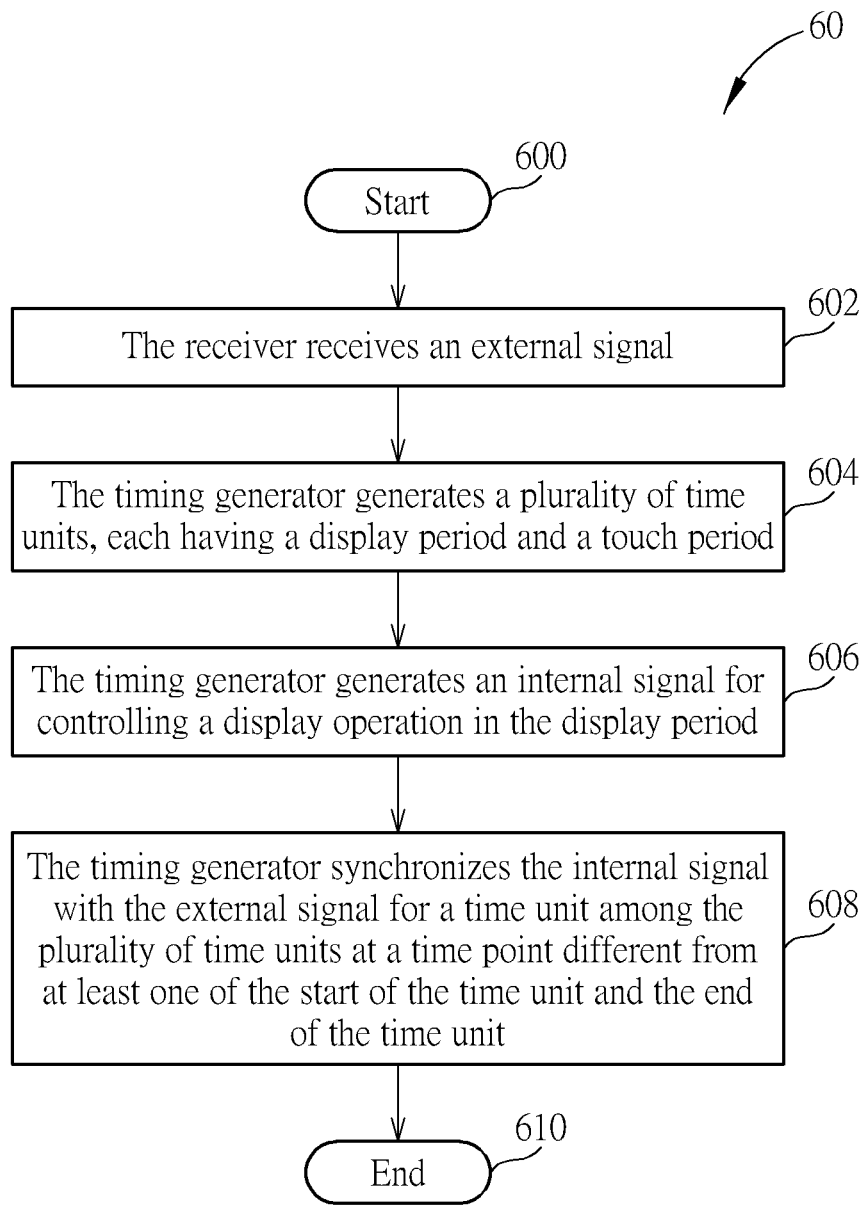
FIG. 6 is a schematic diagram of a timing control process according to an embodiment of the present invention.

The abovementioned synchronization method of the dynamic long H-blank scheme may be summarized into a timing control process 60, as shown in FIG. 6. The timing control process 60, which may be realized in a touch and display driver system such as the touch and display driver system 30 shown in FIG. 3, includes the following steps:

Step 600: Start.

Step 602: The receiver receives an external signal.

Step 604: The timing generator generates a plurality of time units, each having a display period and a touch period.

Step 606: The timing generator generates an internal signal for controlling a display operation in the display period.

Step 608: The timing generator synchronizes the internal signal with the external signal for a time unit among the plurality of time units at a time point different from at least one of the start of the time unit and the end of the time unit.

Step 610: End.

In the timing control process 60, the external signal may be an external synchronization signal such as an H-sync signal of MIPI, and the internal signal may be an internal H-sync signal for synchronizing the output of each line data. The detailed operations and alternations of the timing control process 60 are illustrated in the above paragraphs, and will not be narrated herein.

To sum up, the present invention provides a novel dynamic long H-blank scheme. According to embodiments of the present invention, the internal synchronization signal is synchronized with the external synchronization signal with a fixed number of cycles of the external synchronization signal between every two consecutive synchronization time points. The display period in the first time unit of each image frame except the first image frame may be configured to output a predetermined number of line data more or less than other display periods, and the numbers of line data in the display period in the last time unit of each image frame except the first image frame are also different, to complement the total line count of the entire frame. The start and/or the end of each time unit (except the first time unit of each image frame) may be shifted or delayed by a predetermined number of cycles of the internal synchronization signal. This shifts the long H-blank periods to different gate lines in different image frames, while all touch periods still have an equal length. As a result, the problem of imbalanced stress in the gate lines may be solved, and there is no waste in time periods, which improves the visual performance and/or the touch sensing performance with well allocations of the display periods and touch periods. In addition, the read/write operation of the image data may be well controlled with this synchronization scheme, which prevents the tearing effect resulted from imbalanced read/write speeds and also reduces the size of the line memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling timing for a touch and display driver system, comprising:
   receiving an external signal;
   generating a plurality of time units, each having a display period and a touch period;
   generating an internal signal for controlling a display operation in the display period; and
   synchronizing the internal signal with the external signal for a time unit among the plurality of time units at a synchronization time point different from the start of the time unit and the end of the time unit;
   wherein the start or the end of the time unit falls behind the synchronization time point by a predetermined number of cycles of the internal signal.

2. The method of claim 1, wherein lengths of touch periods in the plurality of time units are substantially equal.

3. The method of claim 1, wherein there are a fixed number of cycles of the external signal between every two consecutive synchronization time points for synchronizing the internal signal with the external signal.

4. The method of claim 1, wherein a cycle time of the internal signal is configured to read a line of display data from a line memory of the touch and display driver system, and a cycle time of the external signal is configured to write a line of display data into the line memory.

5. A touch and display driver system, comprising:
   a receiver, configured to receive an external signal; and
   a timing generator, coupled to the receiver, configured to perform the following steps:
      generating a plurality of time units, each having a display period and a touch period;
      generating an internal signal for controlling a display operation in the display period; and
      synchronizing the internal signal with the external signal for a time unit among the plurality of time units at a synchronization time point different from the start of the time unit and the end of the time unit;
   wherein the start or the end of the time unit falls behind the synchronization time point by a predetermined number of cycles of the internal signal.

6. The touch and display driver system of claim 5, wherein lengths of touch periods in the plurality of time units are substantially equal.

7. The touch and display driver system of claim 5, wherein there are a fixed number of cycles of the external signal between every two consecutive synchronization time points for synchronizing the internal signal with the external signal.

8. The touch and display driver system of claim 5, further comprising a line memory, wherein a cycle time of the internal signal is configured to read a line of display data from the line memory, and a cycle time of the external signal is configured to write a line of display data into the line memory.

* * * * *